D. A. WRIGHT.
JOINT FASTENER.
APPLICATION FILED JUNE 30, 1910.

991,589.

Patented May 9, 1911.

WITNESSES:
George Bambay.
E. B. Marshall

INVENTOR
David A. Wright
BY Munn Co
ATTORNEYS

UNITED STATES PATENT OFFICE.

DAVID ALEXANDER WRIGHT, OF SAN ANTONIO, TEXAS.

JOINT-FASTENER.

991,589. Specification of Letters Patent. Patented May 9, 1911.

Application filed June 30, 1910. Serial No. 569,670.

*To all whom it may concern:*

Be it known that I, DAVID A. WRIGHT, a citizen of the United States, and a resident of San Antonio, in the county of Bexar and State of Texas, have invented a new and Improved Joint-Fastener, of which the following is a full, clear, and exact description.

My invention relates to joint fasteners, and it has for its object to provide a fastener which may be manufactured at little expense and which is so constructed that it may be quickly applied.

The fastener is particularly adapted for screens and it is provided with arms, with cut portions forming laterally projecting teeth, so that when the arms are pushed inwardly in kerfs in a member of the frame of the screen, the teeth will be pressed in the direction of the plane of the arms, the resiliency of the material of which the arms are made, forcing the teeth outwardly at each side to engage the member of the frame and to prevent the withdrawal of the arms. The head of the fastener, which is secured to the arms, is disposed in a kerf in another member of the frame, the head being provided with flanges, with cutting edges, which engage the second-mentioned member to hold the two members together.

Still other objects of the invention will appear in the following complete description.

In this specification I will describe the preferred form of my invention, it being understood that the scope of the invention is defined in the appended claims.

Reference is to be had to the accompanying drawings forming a part of this specification, in which similar characters of reference indicate corresponding parts in all the views, and in which—

Figure 1:
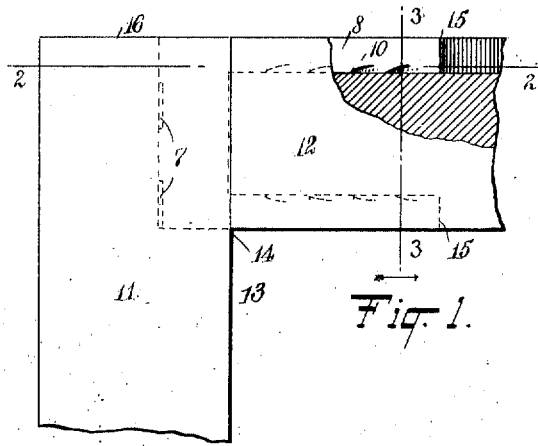
Figure 2:
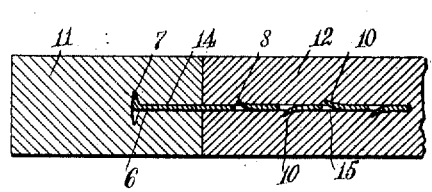
Figure 4:
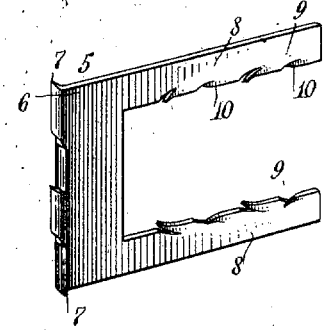
Figure 3:
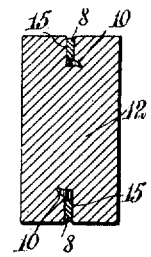
Figure 5:
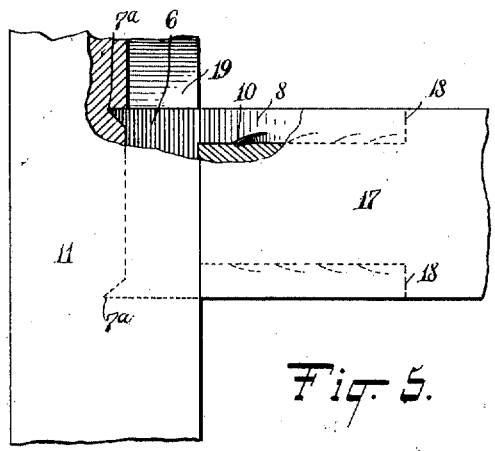
Figure 6:
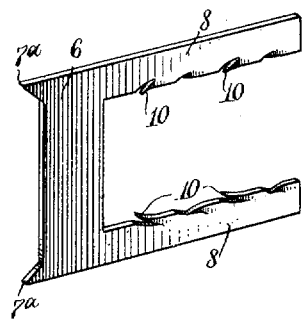

Figure 1 is a fragmentary view, partially in section, showing a corner of a frame held together with my fastener; Fig. 2 is a sectional view on the line 2—2 of Fig. 1; Fig. 3 is a sectional view on the line 3—3 of Fig. 1; Fig. 4 is a perspective view showing my joint fastener; Fig. 5 is a fragmentary view of two members of a frame held together by a modified form of the fastener; Fig. 6 is a perspective view of the modified form of the fastener.

By referring to Fig. 4 of the drawings, it will be seen that the joint fastener 5 has a head 6 with flange teeth 7 disposed at each side, at right angles to the body of the fastener. Integral with the head 6, there are two arms 8, which are spaced from each other, these arms 8 having cut portions 9 in their edges, facing each other, by which means teeth 10 are formed, which are bent laterally, as shown in the drawings. I prefer to form four or more teeth 10 on each of the arms 8, two or more of these teeth 10 being bent laterally at each side of the arms respectively.

The joint fasteners having been manufactured as has been described, they are applied to the members 11 and 12 of the frame 13 in the following manner: A kerf 14 is made in the member 11 on its inner side, as best shown in Fig. 2 of the drawings, this kerf 14 extending through the top 16 of the member, and kerfs 15 are made in the member 12 at its top and bottom, these kerfs 15 extending through the end of the member. This having been done, the joint fastener 5 is disposed over the kerf 14 and is driven into the said kerf from the top of the member 11, the flange teeth 7 cutting the member 11 at each side of the end of the kerf 14 as the fastener is driven into position. When this has been done, the arms 8 are driven into the kerfs 15 at the top and at the bottom of the member 12, the bottoms of the kerfs 15 being spaced apart at a distance substantially the same as the distance between the arms 8. While the teeth 10 will permit the arms 8 to be driven readily into the kerfs 15, the said teeth 10, because of their resiliency, will engage the member 12 at the sides of the kerfs and prevent the withdrawal of the arms from the kerfs. As shown in the drawings, these teeth 10 have their terminals disposed in the direction of the head 6. The flange teeth 7 will prevent the withdrawal of the fastener from the side of the member 11. In this way, the members are secured at the four corners of the frame.

In Fig. 6 of the drawings, I show a modified form of my fastener, in which the teeth 7ª of the head 6 are disposed in alinement with the head and are not bent, as shown in Fig. 4 of the drawings. This modified form of the fastener is used to secure the transverse member 17 to the members 11 of the frame. Kerfs 18 are made in the top and the bottom of the transverse member 17, these kerfs 18 extending through the ends of the member, the arms 8 of the modified form of the fastener being inserted in these kerfs 18 and the teeth 10 on the arms preventing the withdrawal of the arms in a manner which has been explained. The heads 6 of the modified form of the fastener are disposed in recesses 19 in the sides of the members 11, the teeth 7ª extending into the members 11 to hold the fasteners and the transverse member 17 in place.

In constructing the frame 13, the fasteners are driven into the upper and lower ends of the members 11 and the two fasteners of the modified form are secured to the transverse member 17 as has been described. The fasteners, which have been secured to the ends of the members 11, are then disposed in alinement with the kerfs 15, and the heads 6 on the fasteners, which have been secured to the transverse member 17, are disposed in alinement with the recesses 19 in the members 11. The members 11 are then driven toward each other, clamping the members 12 and the transverse members 17 therebetween.

Having thus described my invention, I claim as new and desire to secure by Letters Patent:

1. In combination with a member having kerfs extending through opposite sides, a joint fastener having two arms spaced from each other and disposed in the kerfs respectively, teeth on the inner edges of the arms for engaging said member, each of the arms being adapted for holding its companion arm in one of the kerfs of the said member respectively, and means by which the joint fastener may be secured to another member.

2. In combination with two members having kerfs, a joint fastener having a head with teeth, the head being disposed in the kerf in one of the members, with the teeth engaging the member, two arms secured to the head, spaced from each other and disposed in kerfs in opposite sides of the other member, and teeth on the inner sides of the arms for engaging the last-mentioned member, each of the arms being adapted for holding its companion arm in a kerf in the second-mentioned member.

In testimony whereof I have signed my name to this specification in the presence of two subscribing witnesses.

DAVID ALEXANDER WRIGHT.

Witnesses:
FRED L. NOYES,
CLYDE EVANS.

---

Copies of this patent may be obtained for five cents each, by addressing the "Commissioner of Patents, Washington, D. C."